Oct. 18, 1932.     F. J. SHOOK     1,883,018

TIRE VULCANIZER

Filed Aug. 21, 1929     3 Sheets-Sheet 1

Inventor

Florain J. Shook,

By Robert McPierson,

Attorney

Oct. 18, 1932.   F. J. SHOOK   1,883,018
TIRE VULCANIZER
Filed Aug. 21, 1929    3 Sheets-Sheet 2

Inventor
Florain J. Shook,
By Robert M. Pierson,
Attorney

Patented Oct. 18, 1932

1,883,018

UNITED STATES PATENT OFFICE

FLORAIN J. SHOOK, OF AKRON, OHIO, ASSIGNOR TO NATIONAL RUBBER MACHINERY COMPANY, OF AKRON, OHIO, A CORPORATION OF OHIO

TIRE VULCANIZER

Application filed August 21, 1929. Serial No. 387,400.

This invention relates to molding apparatus and particularly to tire vulcanizers of the watch-case type, although not wholly confined thereto.

One of my objects is to increase the convenience of loading and unloading the vulcanizer. To this end, in the preferred form of the invention, I mount said vulcanizer in an upright position, backwardly inclined from the vertical at a small angle, and provide for temporarily supporting the tire by its inner periphery on a ledge or equivalent which may be a stripper ring to hold the tire slightly forward of its molding position, the rearward inclination preventing the tire from falling off. In a dual structure, two of such vulcanizers may be mounted back-to-back in inverted V-fashion, providing a compact and advantageous structure.

A further object is to provide improved means for locking and unlocking the door of a vulcanizer or the like, for initiating the opening movement or completing the closure of the door, and for swinging the door to or from a full-open position. A further object is to provide for performing these operations successively by the action of a single power device such as a fluid-pressure ram.

Additional objects relate to an improved mode of operating a stripper and to automatic means for automatically coordinating the action of a stripper-operating means with that of a door-actuating ram or similar device.

Of the accompanying drawings, Fig. 1 is a front elevation of a watch-case tire vulcanizer embodying my improvements.

Figure 1:
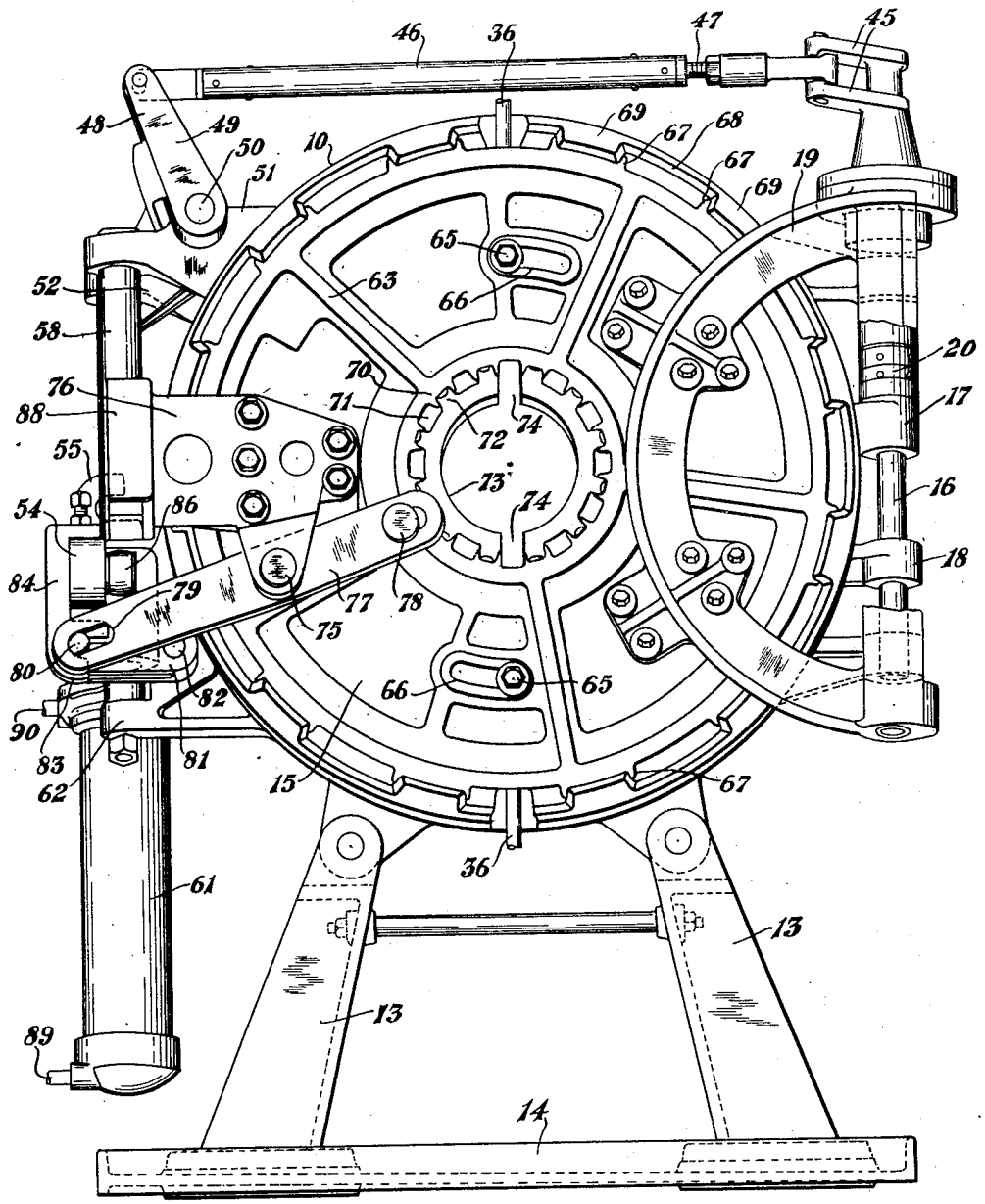
Figure 2:
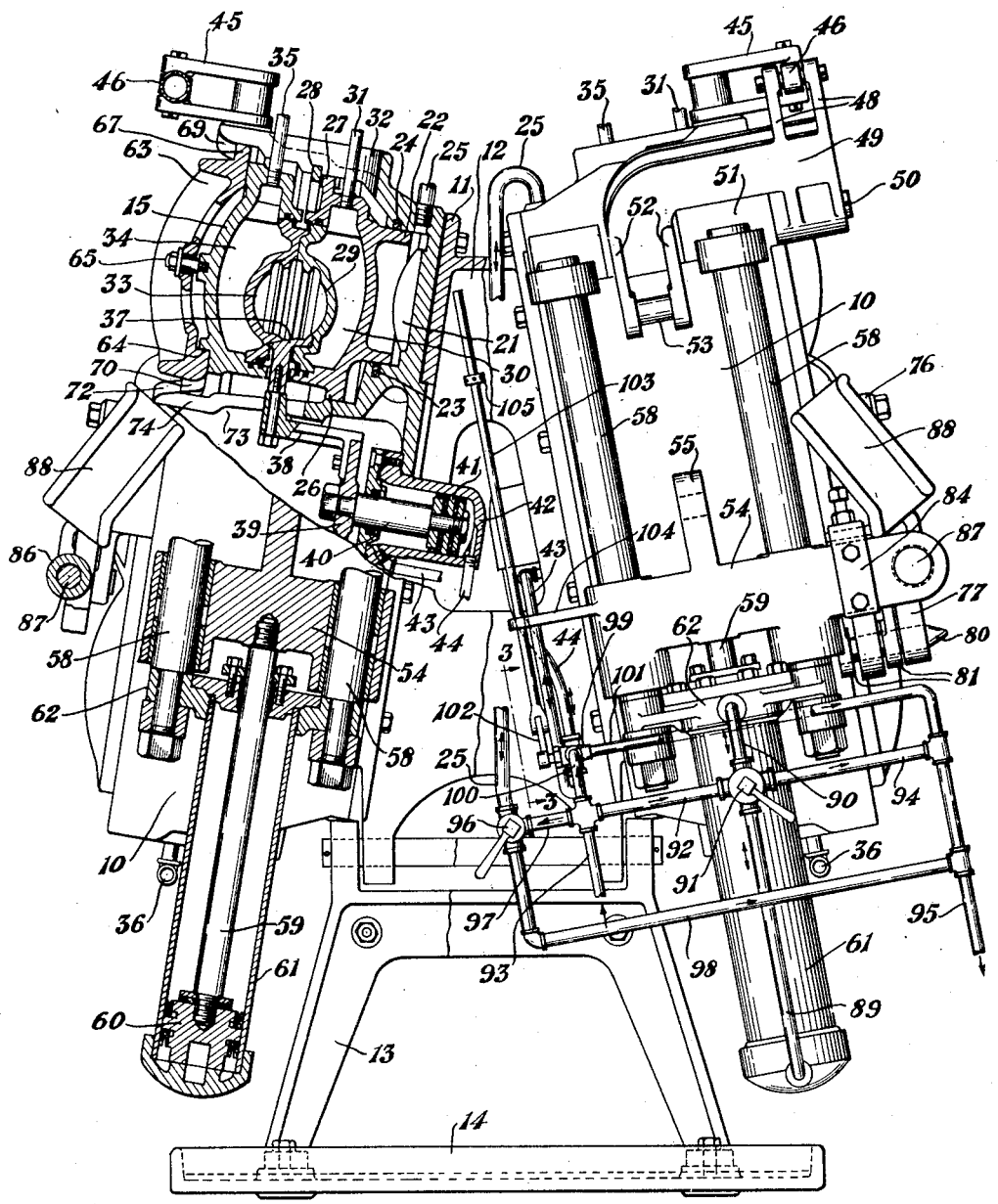
Fig. 2 is a side elevation, partly in section, showing the construction of a dual tire vulcanizer in accordance with my invention and representing the side view of the apparatus shown in Fig. 1.

As indicated in Fig. 2, I mount a pair of vulcanizer frames 10, 10 back-to-back upon an intermediate frame 11, leaving a space 12 between the vulcanizers, open to the atmosphere at its sides and lower end, to provide ventilation and afford a convenient location for stripper cylinders and their piping hereinafter referred to. These frames 10 surround and substantially enclose the tire molds and may be termed casings or casing bodies. The frame 11 is of inverted V-shape, to connect the casing bodies 10 in that relation, and is supported by standards 13 resting on a base 14.

Each of the vulcanizers is mounted in an upright position which provides easier access to its interior and greater facility in loading and unloading than a horizontal or nearly horizontal position, but backwardly inclined at a small angle from the vertical, whereby the lower edge of each vulcanizer is placed forward of its upper edge and the raw tire or the cured tire may be temporarily supported in front of the rear molding cavity, as hereinafter described, without falling out. The amount of backward inclination is subject to some latitude, but an angle of the order of 10 degrees from the vertical has been found to require substantially no more muscular effort and bending over on the part of the operator in placing and removing the tires, than the fully vertical type, and the operating difficulties of the latter are avoided, particularly that of properly retaining a raw tire, which has not been "rimmed up", at the entrance to the molding cavity preparatory to closing the vulcanizer. By the term "upright", I refer to an angle of less than 45 degrees from the vertical.

While structurally connected in the manner described, the two vulcanizers have similar molds and operating devices subject to independent control. The casing of each vulcanizer has a door 15 hinged at one edge of the body 10 on an upright shaft 16 parallel with the plane of the casing, said shaft being carried by hinge members 17, 18 on the casing body and its upper and lower ends being embraced by an arcuate hinge member 19 bolted to the face of the door, antifriction bearings 20 being interposed between the hinge members 17 and 19. Door-actuating and locking mechanism is provided as hereinafter described.

Each casing body 10 is formed in its rear portion with an annular hydraulic cylinder 21, in which operates a short-stroke annular piston 22 sealed at its inner and outer peripheries by means of annular packings 23, 24 mounted in grooves in the cylinder walls. Fluid pressure, such as hydraulic pressure, is carried to and from the interior of cylinder 21 by a pipe 25. Forward of the piston proper, the piston casting is formed with inner and outer peripheral guide flanges 26, 27 in sliding contact with counterpart cylindrical guide surfaces formed on the casing 10. A detachable stop ring 28 located on the casing in the path of the outer flange 27 limits the forward movement of the piston.

This direct-acting fluid-pressure cylinder and piston arrangement is a modification of that described and claimed in my prior application Serial No. 153,563, filed Dec. 9, 1926, having the advantage of providing a mold-closing means independent of the door movement, for tightly closing the mold with an even pressure all around its periphery and avoiding the occurrence of uneven or excessive rinds or rubber overflows from the tread crevice of the mold due to local springing of the parts which has constituted an objection to watch-case vulcanizers relying upon a wedging action for effecting the final mold closure.

Detachably mounted in the front face of the piston casting is a tire-mold section or member 29 formed with an annular molding cavity constituting substantially one-half of the tire cavity. Said mold section is spaced from the web of the piston casting by a jacket chamber 30 adapted to contain a heating fluid, such as steam, for vulcanizing the tire, said chamber being supplied by a steam pipe 31 which enters its upper wall through an opening 32 formed in the upper wall of the casing body 10, and the water of condensation may be discharged through a pipe (not shown) connected with the lower portion of the jacket and extending out through an opening at the lower side of the casing similar to the opening 32.

The door 15 carries a mating mold member 33 detachably fitted thereto and separated from the web of the door casting by a steam-jacket chamber 34 which is supplied with steam by a pipe 35 entering through the opening 32 and is drained through a pipe 36 leading from its lower portion. It will be evident that when the door 15 is closed and is locked by the means hereinafter described, the mold 29, 30 may be tightly closed by hydraulic pressure acting on the piston 22 while the tire within the mold-cavity is being vulcanized under internal fluid pressure furnished by the usual air-bag or water-bag contained within the tire. After the vulcanization is completed, the pressure of the piston 22 and the rear mold section against the front mold section and the door may be relieved by discharging the cylinder 21, so that the door may be readily unlocked and the tire may, if desired, be loosened in the mold by retaining the pressure in its air-bag or water-bag after the pressure in the cylinder is relieved.

The rear mold section 29 has fitted at its inner periphery and movable transversely of its plane a bead-molding stripper ring 37, the inwardly-projecting tongue or flange of which is connected at two opposite points with a pair of brackets 38, one of which is shown in Fig. 2, bolted at their outer ends to the stripper ring and at their inner ends to a head plate 39 adapted to be actuated by a small hydraulic ram located coaxially with the tire mold at the back of the casing 10. Said ram includes a piston-rod 40 attached to a double-acting piston 41 movable within a cylinder 42 mounted on the back wall of casing 10 and projecting rearwardly into the space 12 between the two vulcanizers, said cylinder having fluid pipes 43, 44 connected with its front and rear ends and located in said space, for the supply and discharge of water to and from the respective ends. On opening the vulcanizer when a cured tire is to be removed, fluid pressure admitted to the rear end of cylinder 42 forces the ram and stripper ring 37 forwardly to separate the tire from the rear mold section, whereupon the tire is readily removed. A raw tire is then placed upon the projected stripper ring and supported thereon by the engagement of its rear bead and the inner periphery of its air-bag or water-bag with the ring, and by reason of the rearward inclination of the vulcanizer, the tire will be prevented from falling out forwardly, while it is also temporarily held out of full contact with the heated rear mold section and may be brought into proper registry with its molding cavity before the mold is closed, and thus the surface rubber on the tire will not be locally softened by premature contact with the mold. This feature greatly adds to the convenience of loading and unloading the mold, since it combines the ease of application and removal of the product characterizing vertical vulcanizers, with the superior tire-registering features of vulcanizers mounted in a horizontal or nearly-horizontal position. It also avoids the usual preliminary rimming-up and subsequent unrimming of the tires with a two-part rim at their inner periphery, with its attendant requirement of rimming equipment and extra time and labor.

On the upper end of the door-hinge bracket 19 is mounted a forked arm 45 pivotally connected with one end of a link 46 having an adjustment 47 for varying its length, the other end of said link being pivotally connected with one arm 48 of a rock-lever 49, fixed to a rock-shaft 50 which turns in a bearing lug 51 cast on the side of the casing body 10. The other arm 52 of said rock-lever is forked and carries a pin 53 adapted to be pulled downwardly by the descent of a ram-head 54, in a direction to close the vulcanizer door, and pushed upwardly by the ascent of said ram-head to open the door.

Ram-head 54 is formed with a hook 55 to exert the pulling action and a shoulder 56 projecting from under said hook to exert the pushing action and cause the pin 53 to slide under the hook as said pin rises on an arc during the door-closing movement. The nose of hook 55 also has a bevel 57 to crowd the pin 53 out of its upward path in case of any slight misalignment. The action of hook 55 takes place during the upper portion of the travel of the ram-head, so that the lower portion of the latter's travel may be devoted to one or more preliminary operations connected with the opening or closing of the door, such as locking and unlocking it and/or performing the preliminary opening or breaking movement and final closure of said door.

The ram-head 54 slides on a pair of guide-rods 58 extending parallel with the plane of the vulcanizer casing and fixed at their upper and lower ends in lugs on said casing. It connects with the rod 59 of a double-acting hydraulic ram or piston 60 working in a cylinder 61 which is attached at its upper end to the lower guide-rod lug structure 62.

While other arrangements of a power device or devices might be employed, the apparatus is simplified and cost of construction minimized by employing a single fluid-pressure ram device such as 59, 60 etc. for performing all the power functions involved in opening, closing and securing the vulcanizer door, two of such functions in addition to that of moving the door to full open or closed position being here illustrated, namely locking and unlocking the door and imparting the initial breaking-open or final closure through a power-multiplying device such as a cam.

The preferred door lock is of the non-wedging breech-block type and adapted to lock the door at a plurality of points around its inner and outer peripheries. 63 is a locking plate or ring of ribbed skeleton construction mounted to turn on the front face of the door 15 concentrically with the latter and provided with a short journal 64 (Fig. 2) mounted within a bearing shoulder on the door and retained thereon by the heads of a pair of bolts 65, the stems of which occupy slots 66 in the locking plate and act as stops in conjunction with the ends of said slots for limiting the turning movement of the plate. At its outer periphery, the plate 62 is formed with a series of locking lugs 67 adapted to pass through recesses 68 and be turned into registry behind a series of overhanging fixed lugs 69 on the forward outer edge of the body 10. A similar locking arrangement of smaller diameter is shown at the inner periphery consisting of spaced locking lugs 70 on the plate 63, recesses 71, and lugs 72 formed on a hollow boss 73 which projects forwardly from the rear structure of the casing body 10 and is longitudinally slotted at 74 at opposite points for the passage of the stripper-actuating brackets 38.

Pivotally mounted at 75 on lugs at the lower edge of a bracket 76, which is bolted to the door 15 opposite its hinged edge, is a lock-operating lever 77 having a slotted inner end engaging a pin 78 which projects forwardly from the locking plate 63 near the inner periphery of the latter. The outer end of said lever is formed with a longitudinal slot 79 whose sides are adapted to be carried by the swinging movement of the door into and out of coupled relation with a pin 80 which is mounted at the outer end of a short rocker arm 81 pivoted at 82 on the side of the fixed lug structure 62. Pin 80 is adapted to be pulled upwardly to unlock the door by an inverted hook 83 formed on a bracket 84 which is bolted to the ram head 54 and pushed downwardly to lock the door by a shoulder 85 formed on said bracket, these parts operating alternately with the hook 55 and shoulder 56 and on a similar principle.

For performing the initial breaking open or "cracking" operation on the door, which requires considerable power in order to break the adhesion of the tire in the mold and pull the front mold section 33 past the non-skid projections on the tread of the tire, and conversely to perform the final closing movement of the door, I provide an actuating device comprising a cam roller 86 mounted on a stud 87 projecting horizontally inward from one end of the ram head 54 and adapted to enter the channel of a cam lug 88 formed on the outer end of the bracket 76 which is bolted to the door, the sides of the channel in said lug being inclined from the path of movement of roller 86 at an angle of less than 45 degrees to provide a power-multiplying effect in addition to the multiplication of hydraulic pump-supply power in the ram cylinder 61. On the upward or door-opening movement of roller 86, the latter enters the groove of cam lug 88 after the hook 83 has turned the plate 63 to its unlocking position and has left the pin 80.

Figure 3:
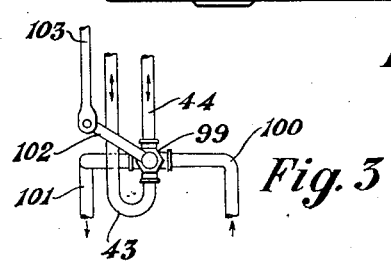
Fig. 3 is a detail rear elevation of the stripper cylinder control valve and connected parts shown in Fig. 2.
Figure 4:
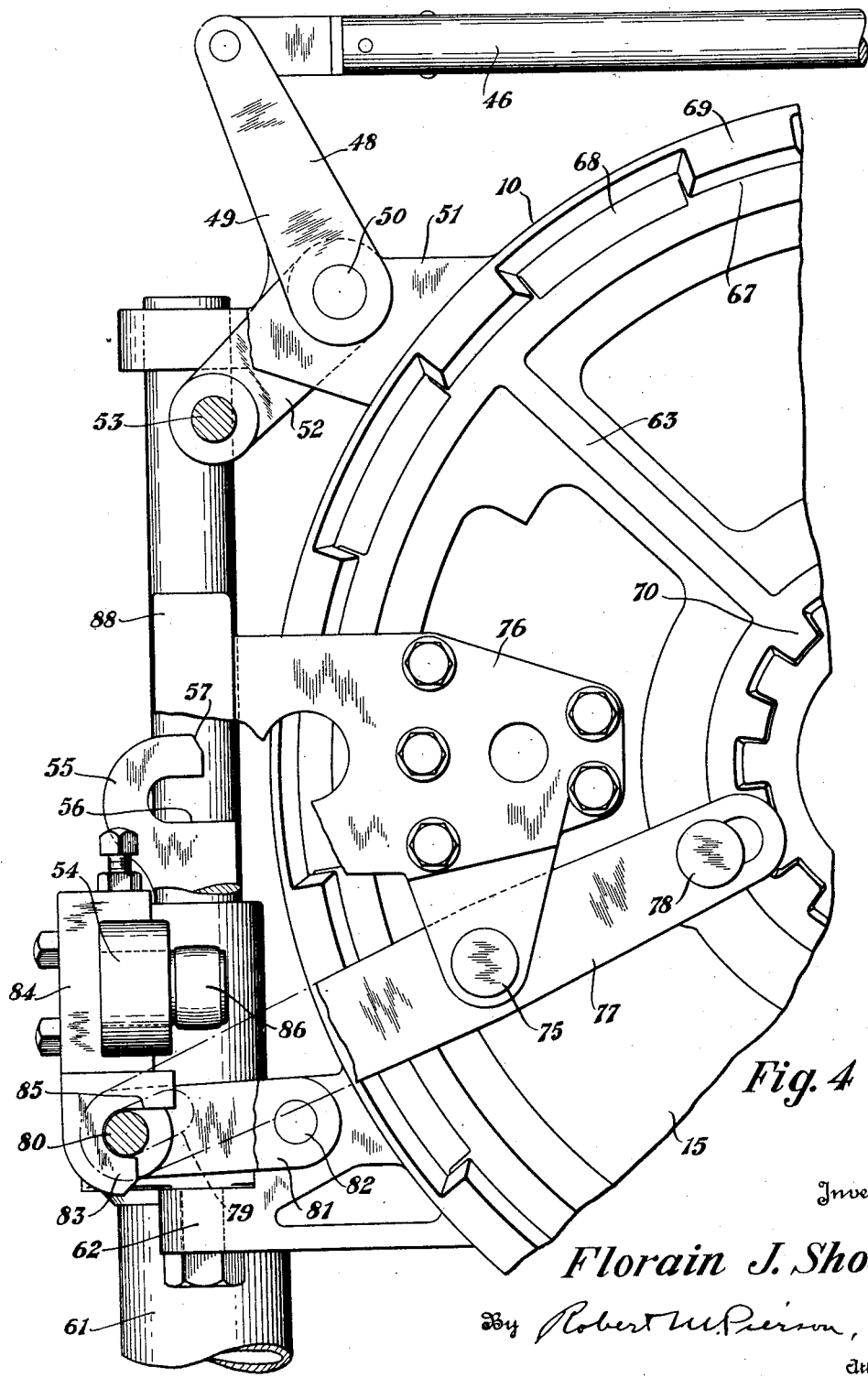
Fig. 4 is a front elevation, partly broken away and in section, showing a part of the apparatus illustrated in Fig. 1, on a larger scale.

The fluid piping and control devices for charging and discharging the hydraulic cylinders 21, 42 and 61 are shown in Figs. 2 and 3. Pipes 89 and 90 leading respectively from the upper and lower ends of the cylinder 61 connect with opposite sides of the four-ported casing of a hand-valve device 91, the other two ports of which connect respectively with a branch 92 of a supply pipe 93 and a branch 94 of a drain pipe 95. 96 is a hand-valve device for controlling the hydraulic supply and discharge to and from the mold-operating cylinder 21 of the right-hand vulcanizer, the casing of said valve device having a port connecting with the pipe 25 which leads into the upper side of said cylinder, a second port connecting with a branch supply pipe 97 and a third port connecting with a branch drain pipe 98.

The stripper cylinder 42 is automatically controlled by movements of the ram head 54 through a valve device 99 having pipes 43, 44 leading respectively to the front and rear ends of cylinder 42, a supply branch 100, a draining branch 101, and a valve arm 102 to which is pivoted the lower end of an upright rod 103 guided in a lug 104 which projects laterally from the ram head 54. The weight of said rod and valve arm tends to move the valve to a position for charging the front end of cylinder 42 and discharging its rear end when the ram is depressed. As the ram approaches the upper limit of its stroke, the lug 104 encounters a collar 105 fixed on rod 103 and moves the valve in an opposite direction tending to charge the rear end and discharge the front end of cylinder 42 and project the stripper ring 37. It will be understood that the described piping and control devices are duplicated for the left-hand vulcanizer.

In the operation of this apparatus, assuming the door 15 to be fully open for loading the vulcanizer, the ram head 54 will be at the upper end of its stroke, the cylinder 21 discharged and the stripper ring 37 outwardly projected. A raw tire is placed on said stripper ring and temporarily supported by its inner bead and air-bag or water-bag in a position immediately forward of the molding position and prevented from falling off by its frictional grip on the ring 37 and by the rearward inclination of said ring. Hand valve 91 is then moved to exhaust the lower end and charge the upper end of the hydraulic cylinder 61, causing the ram head 54 to descend. The hook 55 on said ram head draws down the pin 53 to turn lever 49 and through the intermediate connections to swing the door 15 toward its closed position. At the same time lug 104 releases the collar 105 and allows valve arm 102 to descend, shifting the valve 99 to discharge the rear end of cylinder 42 and charge its front end, thereby causing the stripper ring 37 to be drawn back into its normal position at the inner periphery of the rear mold section 29, the raw tire moving with it into the rear half of the mold cavity. When the door has been swung nearly closed, the hook 55 leaves the pin 53 and the cam roller 86, entering the upper end of the groove in cam lug 88, causes the door to be moved into fully-closed position, the slotted outer end of lever 77 meanwhile being brought into coupled relation with the pin 80 in the latter's uppermost position so that the completion of the downward movement of the ram head, through the pushing action of shoulder 85 against said pin, may turn the outer end of lever 77 downwardly, thereby shifting the locking plate 63 in the opposite direction and moving its lugs 67 and 70 which have passed through the recesses 68 and 71, laterally into register behind the fixed lugs 69 and 72. Thereby the door is automatically locked and the operator then turns the hand valve 96 to admit hydraulic pressure into the corresponding cylinder 21 and force the rear mold section 29 tightly against the front section 33 carried by the door. Internal pressure is then admitted to the air-bag or water-bag and the steam heat in the jackets 30 and 34 vulcanizes the tire. When the cure is complete the foregoing operations are reversed to first unlock the door, then crack or start it open through the action of the roller 86 and cam lug 88, then swing the door fully open and finally project the ring 37 to strip the tire from the rear mold section and allow it to be removed by the operator.

The foregoing embodiment may be variously modified and parts omitted or added or equivalents substituted without departing from the scope of my invention as defined in the claims.

I claim:

1. A dual tire vulcanizer comprising a pair of connected vulcanizer casings mounted back-to-back in inverted V-fashion at an angle of the order of 20 degrees and separated by a ventilating space open to the atmosphere, and heat-jacketed molds mounted on said casings and each comprising separable mold sections, one of which is pivoted on an upright axis to open and close with respect to the other.

2. A dual tire vulcanizer comprising a pair of connected vulcanizer casings mounted back-to-back in spaced relation, tire molds in said casings, each provided with a stripper, cylinders mounted at the backs of said casings and having pistons for operating the strippers, and fluid piping located in the space between said casings and connected with said cylinders.

3. The combination of a casing having a door, a fluid-actuated slide movable in a rectilinear path, said door and slide being provided, one with a channeled cam member and the other with a roller adapted to pass into and through said cam member for initiating the opening and completing the closing movement of said door, and door-locking means also operated by said slide.

4. A tire vulcanizer comprising a casing, a door hinged at one side thereof and having an arm, a fluid-pressure ram mounted at the opposite side of said casing, a lever actuated by said ram, a cross-link connecting said lever with the door arm, and door-locking means operated by said ram.

5. The combination of a casing, a door hinged at one side thereof, a fluid-pressure ram mounted at the opposite side, door-locking means operated by said ram, means operated by the ram for initiating the opening movement of the door, and means including a lever operated by the ram and a cross-connection from said lever to the door for swinging the latter to full-open position.

6. The combination of a casing having a hinged door, a door-controlling lever, a hook for operating said lever, and a fluid-pressure ram for carrying said hook into and out of coacting relation with said lever.

7. The combination of a casing having a hinged door, locking means therefor, means for swinging said door, hook-engaged members for operating said door-locking and door-swinging means, a fluid-pressure ram, and hooks carried by said ram and adapted to engage the respective said members at opposite ends of the stroke of said ram.

8. The combination of a casing having a hinged door, a locking plate and a plate-operating lever separately pivoted thereon, and an actuator mounted on the casing and adapted to be coupled with said lever by the closing movement of the door.

9. The combination of a casing having a hinged door, a ram on said casing, a pivoted arm upon the casing actuated by said ram and having a coupling pin, and door-locking means on said door including an operating member formed to receive said pin as the door is closed.

10. In a tire vulcanizer, the combination of a casing having a hinged door, a door-opening ram, a mold in said casing having a tire stripper, a stripper-operating fluid-pressure cylinder, and a valve device controlling said cylinder and actuated by the traverse of the ram for automatically causing the stripper to be operated to free the tire from the mold when the door has been opened by the ram.

In witness whereof I have hereunto set my hand this 20th day of August, 1929.

FLORAIN J. SHOOK.